| United States Patent [19] | [11] | 4,284,657 |
|---|---|---|
| Stanton | [45] | Aug. 18, 1981 |

[54] FLUIDIZED OLEORESIN COMPOSITIONS

[75] Inventor: Norman K. Stanton, Arlington Heights, Ill.

[73] Assignee: Kraf, Inc., Glenview, Ill.

[21] Appl. No.: 110,787

[22] Filed: Jan. 9, 1980

[51] Int. Cl.³ .............................................. A23L 1/221
[52] U.S. Cl. ...................................... 426/651; 426/96
[58] Field of Search .................................. 426/651, 96

[56] References Cited

U.S. PATENT DOCUMENTS

| 1,545,993 | 7/1925 | Alsberg | 426/651 |
|---|---|---|---|
| 2,021,027 | 11/1935 | Snell | 426/651 X |
| 2,422,145 | 6/1947 | Taylor | 426/651 |
| 2,508,978 | 5/1950 | Tribble | 426/651 |
| 2,626,218 | 6/1953 | Johnstone et al. | 426/651 |
| 2,680,690 | 6/1954 | Schumm et al. | 426/651 |
| 2,778,738 | 1/1957 | Fagen | 426/651 |
| 2,860,054 | 11/1958 | Yanick | 426/651 |
| 2,906,626 | 9/1959 | Eagon et al. | 426/651 X |
| 2,925,344 | 2/1960 | Peat | 426/651 |
| 3,464,831 | 9/1969 | Ziegler | 426/651 |
| 3,619,212 | 11/1971 | Mori et al. | 426/651 |
| 3,906,116 | 9/1975 | Quesnel et al. | 426/651 X |
| 4,001,438 | 1/1977 | Marmo et al. | 426/96 |

FOREIGN PATENT DOCUMENTS 1521691 8/1978 United Kingdom ................. 426/651

*Primary Examiner*—Joseph M. Golian
*Attorney, Agent, or Firm*—Fitch, Even, Tabin, Flannery & Welsh

[57] ABSTRACT

Stable, sterile, aqueous based fluidized oleoresin compositions and methods for making such compositions comprising a small particle size stable aqueous dispersion of from about 10 to about 20% each of an oleoresin component and an polyoxyethylene ether of sorbitol monooleate having about 20 oxyethylene groups per molecule. The compositions further include an edible hydrophilic gum and phosphoric acid.

7 Claims, No Drawings

FLUIDIZED OLEORESIN COMPOSITIONS

The present invention relates generally to an aqueous fluidized oleoresin of a spice and more particularly, this invention relates to stable, sterile, aqueous fluid compositions containing oleoresins of spices, such as oleoresin of black pepper.

The pepper of commerce is derived from dried pods of a Piperaceae plant, and particularly the *Piper nigrum* plant. Normally, black pepper is prepared by grinding the whole dried pods, whereas white pepper is obtained by grinding only the inner portion of the dried pods. The pods are composed of celluosic tissue, starch, sugars and resinous matter. The pods also include piperine, volatile oils and fixed oils. It is the piperine component which is responsible for the "bite" of the pepper, and the volatile oils provide the aromatic characteristic of pepper. Similarly, other spices of commerce such as above and ginger are of natural origin. In this connection, oleoresin clove is derived from the unopened, dried flower bud of an evergreen plant of the Myrtacea family, Eugenia caryophyllata, while oleoresin ginger is derived from rhizomes of the Zingiber officinale plant of the Zingiberacea (ginger) family.

A substantial portion of the pod does not contribute to the condiment, and in order to make more efficient use of pepper, it has been commercial practice to extract the piperine, volatile oil and fixed oil from the dried pepper pods by the use of a solvent, such as alcohol, acetone, or ethylene dichloride. After extraction, the solvent is removed, as by distillation, and there remains an extract of pepper, which commodity is conventionally known as "oleoresin of black pepper". Other oleoresin spices are similarly prepared. This oleoresin is a heterogeneous mass which, as indicated, is composed of piperine, resinous materials, volatile oils and fixed oil. At ambient temperatures, the piperine is insoluble in the resinous material and oils, but upon stirring, the piperine and resinous material become suspended in the oil medium. However, upon standing, the resin and piperine settle out of the oil. As a consequence, such resin is not readily used in the flavoring of food products, largely for the reason that the tendency of the constituents of the oleoresin to separate results in non-uniformity of flavor.

Substantial effort has been made in order to overcome the separation difficulty, and to provide uniform dispersion of pepper in food products which are flavored thereby. In this regard, for example, the oleoresin has been dispersed on a solid base such as salt or sugar, the resulting condiment comprising about 5% oleoresin. Such condiment has been available for many years and is referred to in commerce as "soluble" black pepper. However, in this form, the oleoresin as exposed to atmospheric conditions may deteriorate so that the oleoresin loses its desirable aroma and flavor characteristics. It is often disadvantageous to use the soluble black pepper because of the relatively low concentration of oleoresin, ie., about 5 percent of the base. Furthermore, such low concentration increases in the cost of handling, transportation and storage of the soluble black pepper. In addition, the solid base itself may be undesirable in the carrier form, or may adversely affect the food product which is to be seasoned.

Various attempts have been made to solubilize the oleoresin of black pepper. For example, a patent to Schumm, U.S. Pat. No. 2,680,690, discloses the use of anhydrous lactic acid to solubilize piperine. While anhydrous lactic acid, which is rather difficult to maintain in an anhydrous condition, effectively solubilizes piperine, difficulty has been experienced in maintaining a homogeneous solution of all of the ingredients of the oleoresin of black pepper at high concentrations of the oleoresin.

A patent to Johnstone, et al., U.S. Pat. No. 2,626,218, is also directed to solubilizing the oleoresin of black pepper, and suggests the use of a substantially anhydrous, normally liquid organic acid, which acid is substantially miscible with the essential oils of oleoresin. However, this patent discloses the need for removing the fixed oils from the oleoresin of pepper, and is limited to the use of normally liquid organic acids.

A patent to Fagen U.S. Pat. No. 2,778,738, which patent was assigned to the predecessor of the assignee of this invention, discloses solubilizing oleoresin of pepper in propylene glycol. However, the degree of solubility is limited to about 33 percent of oleoresin in propylene glycol.

U.S. Pat. No. 2,860,054 to Yanick, also assigned to the predecessor of the present assignee, is directed to a solution of black pepper oleoresin including an acetate containing compound, an organic acid, and an edible alcohol such as ethanol. However, the Yanick solution is anhydrous, contains alcohol, and has various other disadvantages.

U.S. Pat. No. 2,422,145 to Taylor discloses a solution of an essential oil and various hydroxy polyoxyethylene ethers of partial esters, while U.S. Pat. No. 2,508,978 to Tribble discloses a solution of an oleoresin containing hexitol polyoxyethylene mono-fatty acid esters, sugar and water. However, such solutions also have various disadvantages including a high surfactant level which may adversely affect the flavor and/or physical properties of a seasoned food product. There is a need for an aqueous based oleoresin material of uniform, sterile composition which may be readily handled in food processing procedures, and which does not adversely affect physical properties of various food materials such as salad dressings.

Accordingly, it is an object of the present invention to provide improved, shelf-stable, fluidized oleoresin compositions and methods for preparing and using such compositions. It is a further object to provide such methods and compositions which have desirable microbiological and organoleptic properties in an aqueous base, and which may be readily blended with various food compositions without adverse affect on the physical properties of the food composition.

These and other objects of the invention will become more apparent from the following detailed description.

Generally in accordance with the present invention, aqueous, fluid, substantially sterile, shelf stable oleoresin compositions are provided, as well as methods for manufacturing such oleoresin compositions. Shelf stable, fluid, oleoresin compositions in accordance with the present invention generally comprise a homogenous, substantially uniform mixture of from about 10% to about 20% by weight of the selected oleoresin component, and from about 10% to about 20% of a surfactant selected from the group consisting of polyoxyethylene ethers of sorbitol monooleate, having about 20 oxyethylene groups per molecule, as follows:

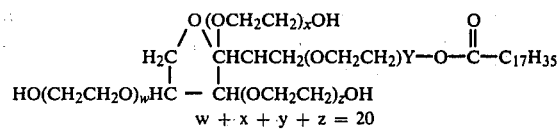

$$w + x + y + z = 20$$

The compositions further comprise from about 0.025% to about 1% by weight of phosphoric acid, from about 0.25% to about 2% of an edible hydrophilic gum which provides thickening under acidic conditions such as xanthan gum, and at least about 60 percent by weight of water. Optionally, antimycotic or preservative materials such as potassium sorbate, sorbic acid and/or sodium benzoate may be included in the range of from about 0.001% to about 0.2% by weight.

As indicated, the compositions in accordance with the present invention comprises an oleoresin material, and in this connection the oleoresin material may be selected from the group consisting of oleoresins of the natural spices and herbs. Such oleoresins are generally conventionally prepared from the appropriate natural plant tissues containing the desired oleoresin flavor ingredient, by solvent extraction, followed by solvent removal. The natural oleoresin material contains essential oils and organic soluble resins, and the like, of the original plant material, together with amounts of nonvolatile fatty oils, also there present. Oleoresin black pepper is particularly difficult to provide in stable, fluidized form, and the present invention finds particular utility in respect of fluidized oleoresin black pepper compositions. Examples of other natural oleoresin materials include oleoresins of allspice, anise, basil, capsicum, caraway, cardamom, celery, cinnamon, clove, coriander, cubeb, cumin, dill seed, fennel, garlic, ginger, laurel leaf, mace, marjoram, nutmeg, mustard, onion, origanum, paprika, rosemary, sage, tarragon, thyme, tumeric, and vanilla.

Compositions utilizing oleoresin black pepper as substantially the sole oleoresin component in accordance with the present invention have proven to be particularly useful, as indicated previously. Another particularly desirable mixture which has been utilized is the mixture of oleoresin clove and oleoresin ginger.

The oleoresin components may be standard oleoresin products of commerce, and such materials may be provided in accordance with conventional methods of preparation. For example, in preparing an oleoresin black pepper product, black pepper corns may be ground and mixed with a solvent such as acetone, it being understood that other solvents may be used. The oleoresin may be extracted in the conventional type of continuous extraction apparatus until the exraction of the oleoresin is completed. Upon completion of the extraction, the insoluble materials, such as the cellulosic materials, the starches and sugars are substantially removed. The solvent is subsequently evaporated by distillation to provide an oleoresin pepper material comprising the soluble piperine and volatile oils which are present in the pepper corns. Clove and ginger oleoresin components may similarly be prepared in accordance with conventional techniques.

Extracted oleoresin materials of commerce may have their oleoresin content standardized by addition of small amounts of materials such as vegetable oils, or mono and/or diglycerides, but it is best that such additions, particularly of vegetable oils, be avoided or immunized in the practice of the present invention.

It is difficult to prepare stable, aqueous compositions of oleoresin materials of food grade quality which remain substantially homogenous in composition. In accordance with method aspects of the present invention, the selected oleoresin component, the xanthan gum component, and the sorbitol monooleate polyoxyethylene ether components are combined, and blended together at an elevated temperature sufficient to provide substantially complete solubilization, as indicated by the provision of a substantially transparent (albiet, perhaps dark colored) mixture. For oleoresin black pepper, the elevated temperature will generally be at least about 145° F. preferably in the range of from about 145° F. to about 175° F. to provide a substantially translucent, solubilized blend of these components. The blending of the oleoresin with the sorbitol monooleate polyoxyethylene ether component will best provide a translucent (but dark colored) solution if carried out before addition of the hydrophilic gum. The presence of the gum may render the blend somewhat translucent. Generally, such mixing is best carried out at elevated temperatures of at least about 150° F., and preferably at least about 160° F. A particularly preferred temperature for blending the oleoresin, the xantham gum and the sorbitol monooleate polyethylene component is about 165° F. The addition of the edible, hydrophilic gum component to the oleoresin and sorbitol monooleate polyoxyethylene ether, rather than to the aqueous component, is believed to facilitate the manufacture of the product, as will be subsequently discussed.

The water and phosphoric acid components may be combined, together with any antimycotic or other preservative agents, such as potassium sorbate, to provide a low pH aqueous mixture for combination with the blended oleoresin material. The low pH aqueous mixture need not be at elevated temperature, and may be provided at ambient temperature.

The oleoresin surfactant mixture may subsequently be combined with agitation with the acidified water component, and subjected to shear conditions until a smooth and homogenized blend is obtained. Such shear conditions may be provided by use of a high shear stirring or mixing apparatus, by single or double stage homogenization apparatus, or similar equipment adapted to provide high shear mixing conditions. Relatively high speed, high shear mixing apparatus which operates by high speed rotation of a mixing head on a shaft immersed in the material to be mixed, has been found to be effective apparatus for providing the products of the present invention. Upon mixing the blended, substantially homogenous oleoresin-sorbitol oleate polyether-hydrophilic gum mixture to the aqueous base, the material may initially be very easily mechanically dispersed. Subsequently, when high shear mixing is continued, the viscosity of the blended mixture increases measurably, which increase is believed to be due to the interaction of the gum from the dispersed particles of the oleoresin blend with the aqueous phase. In this manner, it is believed that a stabilizing system is developed for the dispersed material in the aqueous phase. By combining the gum with the oleoresin blend, and subsequently combining and dispersing the oleoresin blend with the aqueous base, it is believed that the provision of very small particle size, stable dispersions are facilitated.

The resulting substantially homogenous oleoresin blend may be subsequently packaged in a suitable container to provide a fluid aqueous based, oleoresin material which has an enhanced oleoresin performance capability. The finished composition has a pH of less than about 4.5 and desirably about 3.5 or less, and maintains its sterility and its homogeneity under ambient storage conditions at ambient temperatures for at least about 9 months. The aqueous fluidized compositions have finely subdivided oleoresin components such that at least about 80 weight percent of the oleoresin has a particle size of less than about three microns. The compositions may be readily metered into an appropriate food product under conditions which provide for uniform process control and distribution of the flavor component into the food product under substantially sterile conditions.

The oleoresin-sorbitol monooleate polyoxyethylene ether component may readily be dispersed in the aqueous base in the form of very small particles, such that at least about 90 weight percent thereof has a particle size of about four microns or less. The entire dispersed mixture should have a mean particle size of less than two microns.

As indicated, compositions in accordance with the present invention have been found to have enhanced performance. In this connection, for example, it has been found that larger amounts of active piperine are found in the finished product than in the original oleoresin black pepper component of the composition. This is believed to be attributed to micronization of the black pepper oleoresin component during the solubilization process. Such micronization is believed to free material which may be entrapped in some manner which does not allow its extraction with chloroform in original analysis of the initial oleoresin black pepper constituent.

Having generally described the present invention, various aspects of the invention will now be further described with respect to the following examples.

EXAMPLE I

Ten pounds of a commercially available oleoresin black pepper are warmed in a glass container in a water bath having a temperature of about 150°–200° F., until the various oleoresin components are melted. Before melting, the oleoresin black pepper has both solidified and liquid components, such that care is taken to obtain a representative sample of the oleoresin material. A liquid, generally homogeneous mixture of the oleoresin black pepper components is obtained. Ten pounds of sorbitol monooleate polyoxyethylene ether having about 20 oxyethylene groups per molecule and 0.433 pounds of xanthan gum are combined with the warmed oleoresin black pepper fluid, and these components are heated with agitation at a temperature of about 165° F. for about 5–10 minutes having a standard slotted conical mixing head, until a substantially homogeneous mixture is provided.

The initial oleoresin black pepper component prior to heating may be an inhomogeneous, dark mixture of the various solid and liquid components of the oleoresin extract. Upon admixture and blending with the sorbitol monooleate polyoxyethylene ether component the resulting homogenous solution has a transparent green appearance indicating the substantial miscibility of the various components.

Subsequently, 46.08 pounds of water, 0.1 pound of 80% phosphoric acid, and 0.05 pounds of potassium sorbate are combined in a separate container at a temperature of 80°–90° F. to provide sterile, aqueous base mixture having a pH of about 2.4.

The acidic aqueous base component and the heated homogeneous oleoresin black pepper—xanthan gum—sorbitol monooleate polyether mixture are combined with high shear agitation over a period of about 10–15 minutes to provide a smooth and homogeneous mixture. The materials are combined by adding the organic material blend to a container containing the acidified aqueous base, in which is inserted the mixing shaft and standard slotted conical mixing head of a commercially available Dispersator mixing apparatus manufactured by Premier Mill Corporation of New York, N.Y. It is noted that the viscosity of the mixture increases substantially several minutes after addition of the organic components, by the slowing of the Dispersator motor.

The aqueous blend of the component has a pH of about 3.2–3.4 and has the following composition by weight:

| Ingredient | Weight Percent |
|---|---|
| Water | 69.12 |
| Oleoresin black pepper (NF) | 15.00 |
| Sorbitol monooleate polyoxyethylene ether | 15.00 |
| Xanthan gum | 0.65 |
| Phosphoric acid (80%) | 0.15 |
| Potassium sorbate | 0.08% |

The aqueous composition has a smooth, uniform, tan or cream colored appearance, and is substantially stable against separation of the various components upon shelf storage at ambient temperatures for at least 9 months. The composition further remains substantially uniform in volume composition over time in shelf storage tests. The oleoresin component is believed to be in emulsified form having a particle size such that over 90 percent by weight has a particle size of less than four microns in diameter, and such that the mean particle size of the blend is less than two microns.

The piperine content of the original oleoresin black pepper component is determined by standard analytical method utilizing chloroform extraction and spectrophotometric analysis at 345 nanometers absorption wavelength.

The aqueous product utilizing chloroform extraction is similarly analyzed by a similar procedure utilizing chloroform extraction.

It is found that larger effective amounts of piperine, an active flavor component of oleoresin black pepper, are provided after the solubilizing treatment than in the original oleoresin black pepper constituent. Obviously, there can not be any more piperine than in the original starting material, and accordingly this analytical finding is attributed to micronization of the oleoresin black pepper, thereby possibly freeing material which might have been entrapped in some manner such, as by a coating, which would not allow, or interfere with, its extraction with chloroform.

Table I shows the results obtained from a number of samples prepared from commercially available oleoresin black pepper materials obtained from five different suppliers, and prepared as previously described.

TABLE I

| | Piperine | |
|---|---|---|
| Sample No. | Original Analysis of Oleoresin Black Pepper | Analysis of solubilized Black Pepper* |
| 1. | 41.77 | 44.49, 44.82, 44.57, 44.74 |

TABLE I-continued

| | Piperine | |
|---|---|---|
| Sample No. | Original Analysis of Oleoresin Black Pepper | Analysis of solubilized Black Pepper* |
| 2. | 40.07 | 43.72, 43.26, 42.89, 43.18 |
| 3. | 41.69 | 43.20, 42.63, 42.56, 43.05 |
| 4. | 40.77 | 43.13, 44.16, 44.54, 44.01 |
| 5. | 39.97 | 41.93, 41.82, 42.03, 42.13 |

*Since the black pepper content in the solubilized mixture is 15% of the original oleoresin, the analytical values obtained are divided by 0.15 to return to the original basis.

Further analysis using conventional methods for determining volatile oils in oleoresin black pepper are used to compare the aqueous fluidized composition with the original black pepper components. A reduction in the total amount of volatile oils in the products is found. This is attributed to the fact that the mixture was heated to approximately 160° F. in an open container during the solubilizing process and loss of low boiling volatiles occurred by azeotropic distillation.

It is pointed out that these are small scale research laboratory preparations and that small losses of volatile oils would be expected. It is believed that large scale runs using closed equipment would minimize loss of volatile oil components.

Table II gives the results of the samples of Table I, analyzed for volatile oils.

TABLE II

| | Volatile Oils | |
|---|---|---|
| Sample No. | Original Analysis of Oleoresin Black Pepper | Analysis of solubilized Black Pepper* |
| 1. | 20.12, 23.41 | 21.43, 21.85 |
| 2. | 21.30, 21.23 | 19.32, 19.30 |
| 3. | 18.20, 18.00 | 15.22, 14.78, 14.44 |
| 4. | 23.91, 24.01 | 23.11, 23.61 |
| 5. | 20.01, 19.79 | 17.31, 17.29 |

*See Footnote in Table I

EXAMPLE II

A series of runs is made which are similar to the runs of Example I, except that alternate gum materials are utilized as stabilizing agents. Further, the pH of the final composition is adjusted to pH 3.4 and the material is heated to 145° F.

The results of these tests are as follows:

| Gum Component | Weight % | Results |
|---|---|---|
| Gum Trajacanth | 1 | Separated and solidified |
| Pregelatinized waxy maize | 5.75% | Separated |
| Guar gum | .6% | Separated |
| Carboxymethyl cellulose | 8% | Separated |
| Gum arabic | 11% | *Separated |

*Gum arabic was separated before the product was sterilized by the addition of phosphoric acid.

EXAMPLE III

Ten pounds of a commercially available oleoresin clove are warmed in a glass container in a water bath having a temperature of about 150°-200° F., and are blended with 225 grams of sorbitol monooleate polyoxyethylene ether having about 20 oxyethylene groups per molecule and about 9.75 grams of xanthan gum are combined with the warmed oleoresin fluid, and these components are heated with agitation at a temperature of about 165° F. for about 5-10 minutes.

Upon admixture and blending with the gum and sorbitol monooleate polyoxyethylene ether components, the resulting homogenous oleoresiun blend has a transparent dark green appearance indicating the substantial miscibility of the various components.

Subsequently, about 1037 grams of water, 2.25 grams of 80% phosphoric acid, and 1.2 grams of potassium sorbate are combined in a separate container at a temperature of 80°-90° F. to provide sterile, aqueous base mixture having a pH of about 2.4.

The acidic aqueous base component and the heated homogeneous oleoresin blend are combined with agitation utilizing high shear mixing apparatus as described in Example I over a period of about 10-15 minutes to provide a smooth and homogeneous mixture. The aqueous blend of the components has a pH of about 3.2-3.4 and has the following composition by weight:

| Ingredient | Weight Percent |
|---|---|
| Water | 69.12 |
| Oleoresin clove | 15.00 |
| Sorbitol monooleate polyoxyethylene ether | 15.00 |
| Xanthan gum | 0.65 |
| Phosphoric acid 80% | 0.15 |
| Potassium sorbate | 0.08% |

The aqueous composition has a smooth, uniform, light green appearance, and is substantially stable against separation of the various components upon shelf storage at ambient temperatures for at least 9 months. The composition further remains substantially uniform in volume composition over time in shelf storage tests. The oleoresin component is believed to be in emulsified micelle form having a mean particle size of less than two microns.

EXAMPLE IV

A fluidized ginger composition is prepared in a manner like that of Example I. In this regard, 345 grams of a commercially available ginger oleoresin, which is a dark black-brown viscous oil, are warmed in a glass container in a water bath and combined with 345 grams of sorbitol monooleate polyoxyethylene ether having about 20 oxyethylene groups per molecule and 15 grams of xanthan gum. These components are heated with agitation at a temperature of about 165° F. for about 5-10 minutes until a substantially homogeneous mixture is provided.

Subsequently about 1590 grams of water, 3.45 grams of 80% phosphoric acid, and about 1.84 grams of potassium sorbate are combined in a separate container at a temperature of 80°-90° F. to provide sterile, aqueous base mixture having a pH of about 2.4.

The acidic aqueous base component and the heated homogeneous oleoresin mixture are combined with agitation utilizing the 0.5 hp high shear mixer described in Example I, over a period of about 10-15 minutes to provide a smooth and homogeneous khaki colored mixture. The fluidized aqueous blend of the components has a pH in the range of 3.2-3.4 and has the following composition by weight:

| Ingredient | Weight Percent |
| --- | --- |
| Water | 69.12 |
| Oleoresin ginger | 15.00 |
| Sorbitol monooleate polyoxyethylene ether | 15.00 |
| Xanthan gum | 0.65 |
| Phosphoric acid 80% | 0.15 |
| Potassium sorbate | 0.08% |

The aqueous composition has a smooth, uniform, tan or cream colored appearance, and is substantially stable against separation of the various components upon shelf storage at ambient temperatures for at least 9 months. The composition further remains substantially uniform in volume composition over time in shelf storage tests. The oleoresin component is believed to be in emulsified form having a mean particle size of less than two microns.

EXAMPLE V

A fluidized clove-ginger composition is prepared. In this regard, about 78.35 grams of oleoresin ginger and about 21.65 grams of oleoresin clove are warmed in a glass container in a water bath and combined with 100 grams of sorbitol monooleate polyoxyethylene ether having about 20 oxyethylene groups per molecule and 3.32 grams of xanthan gum are combined, and these components are heated with agitation at a temperature of about 165° F. for about 5-10 minutes until a substantially homogeneous mixture is provided.

Subsequently, about 383 grams of water, 0.83 grams of 80% phosphoric acid, and 0.442 grams of potassium sorbate are combined in a separate container at a temperature of 80°-90° F. to provide a sterile, aqueous base acidic mixture for dispersion of the oleoresin blend.

The acidic aqueous base component and the heated homogeneous oleoresin component blend are combined with high shear mixing over a period of about 10-15 minutes as indicated to provide a smooth and homogeneous mixture. The aqueous blend of the components has a pH of about 3.2-3.4, and has a smooth, uniform, tan or cream colored appearance. The fluidized blend is substantially stable against separation of the various components upon shelf storage at ambient temperatures for at least 9 months. The composition further remains substantially uniform in volume composition over time in shelf storage tests. The oleoresin component is believed to be in emulsified form having a mean particle size of less than two microns.

The fluidized aqueous oleoresin compositions may be readily and conveniently utilized to season food products. Furthermore, the fluidized compositions may be spray dried, or applied to a traditional edible finely ground or particulate carrier such as gum arabic, sterilized ground nut shells, or starch granules, to provide an edible seasoning or spice simulating a natural seasoning or spice, but which is sterile and free of foreign materials.

While the present invention has been particularly described with respect to certain specific embodiments, it should be appreciated that various modifications, variations and adaptations will become apparent based on the present disclosure, and are intended to be included within the spirit and scope of the present invention.

Various of the features of the present invention are set forth in the following claims.

What is claimed is:

1. An aqueous based, fluidized substantially sterile oleoresin composition comprising from about 10 to about 20 percent by weight of a natural oleoresin, from about 10 to about 20 percent by weight of a surfactant selected from the group consisting of polyoxyethylene ethers of sorbitol monooleate having about 20 oxyethylene groups per molecule and mixtures thereof, from about 0.25 to about 2 percent by weight of an edible hydrophilic gum which provides aqueous thickening properties under acidic conditions, from about 0.025 to about 1 percent by weight of phosphoric acid, and at least about 60 percent by weight of water.

2. An oleoresin composition in accordance with claim 1 wherein said natural oleoresin and said surfactant components are dispersed in said water as small particles having a mean particle size of less than 2 microns.

3. An oleoresin composition in accordance with claim 1 having a pH of about 3.5 or less.

4. An oleoresin composition in accordance with claim 1 wherein said natural oleoresin is selected from the group consisting of oleoresin black pepper, oleoresin clove, oleoresin ginger, and mixtures thereof.

5. A method for manufacturing a fluidized oleoresin composition comprising the step of blending from about 10 to about 20 parts by weight of a natural oleoresin with from about 10 to about 20 parts by weight of a surfactant selected from the group consisting of polyoxyethylene ethers of sorbitol monooleate having about 20 oxyethylene groups per molecule and mixtures thereof, and from about 0.25 to about 2 parts by weight of a hydrophilic edible gum which provides aqueous thickening properties under acidic conditions to provide an oleoresin blend, combining from about 60 parts by weight of water and from about 0.025 to about 1 part by weight of phosphoric acid to provide an acidic aqueous base, adding said oleoresin blend to said acid aqueous base under high shear conditions to substantially homogeneously disperse said oleoresin base in said aqueous acidic base with a mean particle size of less than about 2 microns to produce a fluidized oleoresin composition.

6. A method in accordance with claim 5 wherein said fluidized oleoresin composition is subsequently spray dried.

7. A method in accordance with claim 5 wherein said fluidized oleoresin composition is applied to an edible solid carrier substrate and dried to provide a simulated natural spice or flavoring agent.

* * * * *